US010021456B2

(12) United States Patent
Nakanishi et al.

(10) Patent No.: US 10,021,456 B2
(45) Date of Patent: Jul. 10, 2018

(54) COORDINATION OF MULTIPLE DEVICES FOR DELIVERY OF MULTIPLE SERVICES

(71) Applicant: ARRIS Enterprises, Inc., Suwanee, GA (US)

(72) Inventors: Gregory Nakanishi, San Diego, CA (US); Meng Zhang, San Diego, CA (US); Amol Anant Shinde, San Diego, CA (US); Ngoc Tuong Tran, San Diego, CA (US); Keith J. Kelley, Encinitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/942,280

(22) Filed: Nov. 16, 2015

(65) Prior Publication Data

US 2016/0142771 A1 May 19, 2016

Related U.S. Application Data

(60) Provisional application No. 62/080,593, filed on Nov. 17, 2014.

(51) Int. Cl.
*G06F 3/00* (2006.01)
*G06F 13/00* (2006.01)
*H04N 5/445* (2011.01)
*H04N 21/462* (2011.01)
*H04N 21/436* (2011.01)
(Continued)

(52) U.S. Cl.
CPC ......... *H04N 21/4622* (2013.01); *H04N 5/268* (2013.01); *H04N 21/43615* (2013.01); *H04N 21/482* (2013.01)

(58) Field of Classification Search
CPC ......... H04N 21/4622; H04N 21/43615; H04N 5/268; H04N 21/4882
USPC ......... 725/11, 14, 38, 54, 59, 68, 70, 71, 85, 725/131, 139
See application file for complete search history.

(56) References Cited

U.S. PATENT DOCUMENTS

2006/0251115 A1 11/2006 Haque et al.
2012/0084463 A1 4/2012 Holden et al.
2012/0144416 A1 6/2012 Wetzer et al.
(Continued)

OTHER PUBLICATIONS

Official Action, Re: Canadian Application No. 2,912,060, dated Dec. 9, 2016.

(Continued)

*Primary Examiner* — Nnenna Ekpo
(74) *Attorney, Agent, or Firm* — Bart A. Perkins

(57) ABSTRACT

Methods, systems, and computer readable media may be operable to facilitate the coordination of multiple devices to provide multiple services. A legacy set-top box (STB) configured to provide legacy services may be connected to an enhanced STB that is configured to provide enhanced services. The enhanced STB may include a switch that is configured to switch a content input source between the legacy STB and the enhanced STB. The legacy STB may receive user requests for content, and based on the type of content requested, the legacy STB may output a signal to the enhanced STB directing that the input source be switched according to the type of content requested. A user interface output from the legacy STB may provide a user with one or more menu items for requesting a legacy service or enhanced service.

20 Claims, 8 Drawing Sheets

(51) Int. Cl.
   *H04N 5/268*      (2006.01)
   *H04N 21/482*     (2011.01)

(56) References Cited

U.S. PATENT DOCUMENTS

| | | | | |
|---|---|---|---|---|
| 2013/0295902 A1* | 11/2013 | Justen | ...................... | H04W 8/22 |
| | | | | 455/418 |
| 2014/0115114 A1* | 4/2014 | Garmark | ................. | H04L 65/60 |
| | | | | 709/219 |
| 2014/0150045 A1* | 5/2014 | Mochinaga | ......... | H04N 13/0454 |
| | | | | 725/116 |
| 2014/0281471 A1* | 9/2014 | Bakar | ...................... | G06F 9/445 |
| | | | | 713/100 |
| 2015/0113571 A1* | 4/2015 | Cholas | ............... | H04N 21/4622 |
| | | | | 725/59 |
| 2015/0121445 A1* | 4/2015 | Jung | .................. | H04N 21/2362 |
| | | | | 725/116 |
| 2016/0037123 A1* | 2/2016 | Jones | .................... | H04N 19/70 |
| | | | | 348/441 |
| 2016/0044273 A1* | 2/2016 | Thompson | .............. | H04N 5/268 |
| | | | | 348/569 |

OTHER PUBLICATIONS

Official Action, Re: Canadian Application No. 2,912,060, dated Nov. 8, 2017.

\* cited by examiner

COORDINATION OF MULTIPLE DEVICES FOR DELIVERY OF MULTIPLE SERVICES

CROSS REFERENCE TO RELATED APPLICATION

This application is a non-provisional application claiming the benefit of U.S. Provisional Application Ser. No. 62/080,593, entitled "Coordination of Multiple Devices for Delivery of Multiple Services," which was filed on Nov. 17, 2014, and is incorporated herein by reference in its entirety.

TECHNICAL FIELD

This disclosure relates to coordinating the delivery of multiple services over multiple devices.

BACKGROUND

Service providers continually augment services that are provided to subscribers, and typically, service augmentation may necessitate new or updated subscriber devices and/or software. When a new service is rolled out, a subscriber may be required to give up desirable attributes of a legacy service in order to receive the new service because of subscriber device limitations. For example, a new subscriber device that is required for receiving a new service may not be configured to receive the legacy service.

One such conflict exists in the offering of ultra high definition television (UHDTV) (e.g., 4K content) to subscribers. Content providers may only provide limited UHDTV content, and subscribers may therefore desire the ability to continue receiving legacy, non-UHDTV content (e.g., standard definition content, high definition content, etc.). However, subscriber devices configured to provide UHDTV services may not be configured to provide non-UHDTV services. A subscriber may opt to use multiple subscriber devices in order to receive the new service and the legacy service, but the subscriber would then need to manually connect and disconnect the devices to a display device according to which service the subscriber wanted to receive during a given time. Therefore, a need exists for improving methods and systems for delivering multiple services over multiple devices.

BRIEF DESCRIPTION OF THE DRAWINGS

Like reference numbers and designations in the various drawings indicate like elements.

DETAILED DESCRIPTION

Figure 1:
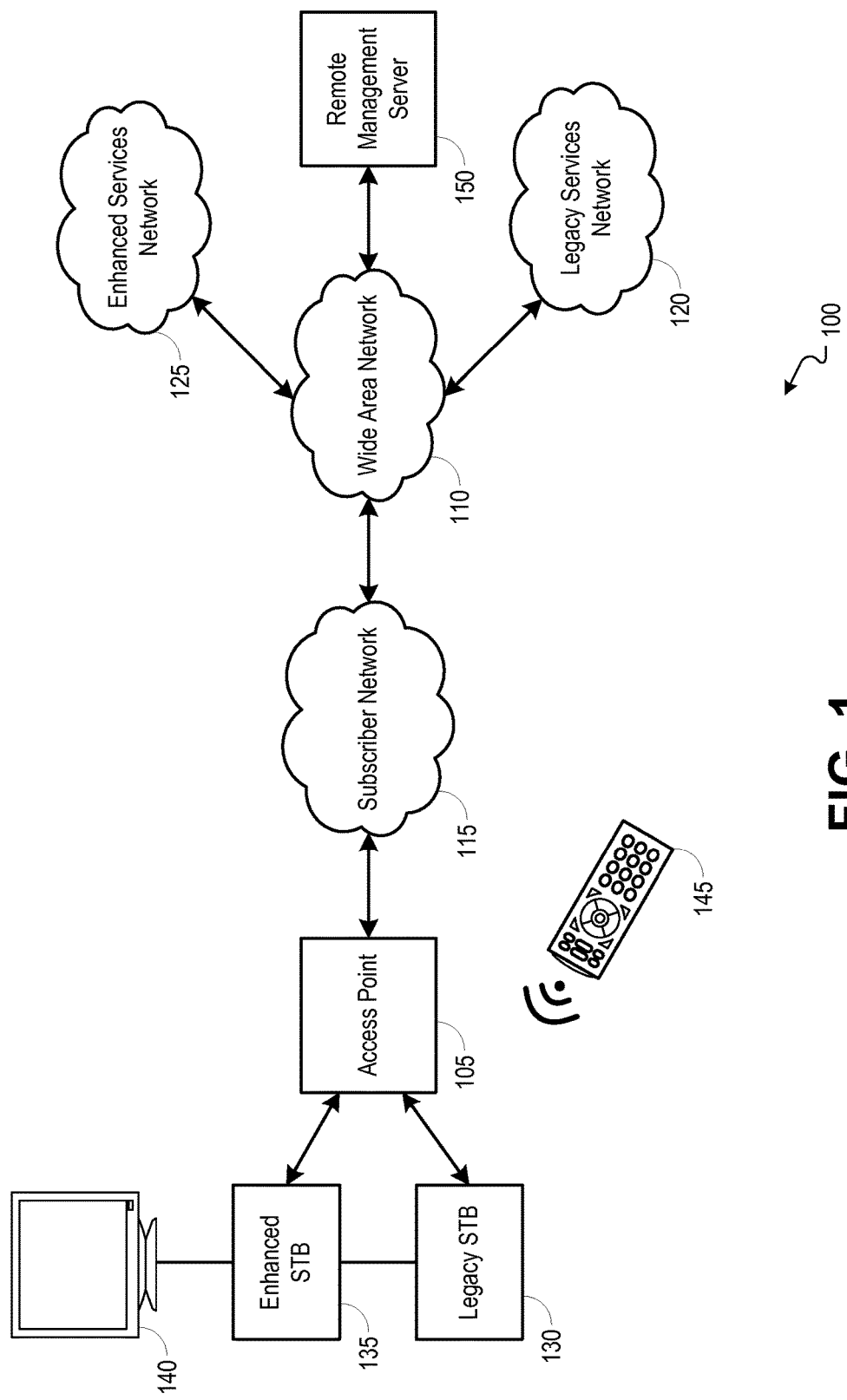
FIG. 1 is a block diagram illustrating an example network environment operable to facilitate the coordination of multiple devices to provide multiple services.

It is desirable to improve upon methods and systems for delivering multiple services over multiple devices. Methods, systems, and computer readable media may be operable to facilitate the coordination of multiple devices to provide multiple services. A legacy set-top box (STB) configured to provide legacy services may be connected to an enhanced STB that is configured to provide enhanced services. The enhanced STB may include a switch that is configured to switch a content input source between the legacy STB and the enhanced STB. The legacy STB may receive user requests for content, and based on the type of content requested, the legacy STB may output a signal to the enhanced STB directing that the input source be switched according to the type of content requested. A user interface output from the legacy STB may provide a user with one or more menu items for requesting a legacy service or enhanced service.

Methods and systems are described herein for delivering multiple services by coordinating delivery and interaction with the services between multiple devices. A service provider may provide a legacy service (e.g., standard definition content, high definition content, etc.) to a subscriber through a legacy device with legacy software (e.g., legacy set-top box (STB)), and may provide an enhanced service (e.g., ultra high definition television (UHDTV)) to the subscriber through an enhanced device (e.g., UHDTV capable STB) with new or updated software.

In order to enable service providers to offer an enhanced service, an enhanced subscriber device may be deployed with new or updated software, and the enhanced device may augment the legacy service that is provided by a legacy device. In embodiments, the legacy service and enhanced service may be provided through different systems and STBs such that, from a subscriber experience perspective, the services appear to be integrated.

An embodiment of the invention described herein may include a method comprising: (a) receiving a request for content at a first device, wherein the first device is configured to provide a first service; (b) outputting a notification of the request for content to a second device, wherein the second device comprises a switching element comprising: (i) an external input connected to an output of the first device; (ii) an internal input connected to a module within the second device that is configured to provide a second service; and (iii) an output connected to a display device; (c) automatically switching between the external input and the internal input based upon a service type associated with the requested content; and (d) outputting the requested content to the display device.

According to an embodiment of the invention, the switching element is switched from the external input to the internal input when the service type associated with the requested content comprises a service type associated with the second service.

According to an embodiment of the invention, the switching element is switched from the internal input to the external input when the service type associated with the requested content comprises a service type associated with the first service.

According to an embodiment of the invention, the first device comprises a set-top box configured to provide standard definition and high definition content.

According to an embodiment of the invention, the second device comprises a set-top box configured to provide ultra high definition television content.

According to an embodiment of the invention, the switching element comprises a high definition multimedia interface.

According to an embodiment of the invention, the notification comprises an extensible markup language message that is output to an HTTP server associated with the second device.

According to an embodiment of the invention, the method described herein further comprises: (a) receiving one or more key codes at a receiver associated with the first device, wherein the one or more key codes are received from a remote control unit; and (b) forwarding the one or more key codes to the second device.

An embodiment of the invention described herein may include an apparatus comprising: (a) an interface configured to be used to receive a notification of a request for content that is received at a first device, wherein the first device is configured to provide a first service; (b) one or more service modules configured to provide a second service; (c) a switching module comprising: (i) an external input interface connected to an output of the first device, wherein the external input interface is configured to be used to receive the first service from the first device; (ii) an internal input interface connected to the one or more service modules, wherein the internal input interface is configured to be used to receive the second service from the one or more service modules; and (iii) an output interface connected to a display device, wherein the output interface is configured to be used to output content to the display device; (d) a switching control module configured to trigger a switch between the external input interface and the internal input interface based upon a service type associated with the requested content.

An embodiment of the invention described herein may include one or more non-transitory computer readable media having instructions operable to cause one or more processors to perform the operations comprising: (a) receiving a request for content at a first device, wherein the first device is configured to provide a first service; (b) outputting a notification of the request for content to a second device, wherein the second device comprises a switching element comprising: (i) an external input connected to an output of the first device; (ii) an internal input connected to a module within the second device that is configured to provide a second service; and (iii) an output connected to a display device; (c) switching between the external input and the internal input based upon a service type associated with the requested content; and (d) outputting the requested content to the display device.

FIG. 1 is a block diagram illustrating an example network environment 100 operable to facilitate the coordination of multiple devices to provide multiple services. In embodiments, an access point 105 may be installed within a customer premise and may provide multiple services to one or more devices within the customer premise. The access point 105 may be a gateway device (e.g., residential gateway or broadband gateway), a modem device, a wireless router or extender, or any other device configured to transmit communications to and/or receive communications from a client device. The access point 105 may receive the multiple services from a wide area network (WAN) 110 via a connection to a subscriber network 115 (e.g., coaxial cable, optical fiber, twisted pair network, wireless networks including 4G and LTE, etc.). For example, legacy services (e.g., standard definition (SD) and high definition (HD) multimedia services) may be delivered to the access point 105 from a legacy services network 120, and enhanced services (e.g., 4K or ultra high definition television content (UHDTV)) may be delivered to the access point 105 from an enhanced services network 125.

In embodiments, a legacy STB 130 may be installed within the customer premise and may be configured to receive and output legacy services. For example, legacy services received at the access point 105 may be delivered to the legacy STB 130.

In embodiments, an enhanced STB 135 may be installed within the customer premise and may be configured to receive and output enhanced services. For example, enhanced services received at the access point 105 may be delivered to the enhanced STB 135.

To augment a legacy STB 130 that is providing a legacy video service, but which may not be capable of providing an enhanced video service, a high-definition multimedia interface (HDMI) output of the legacy STB 130 may be connected to the HDMI input of the enhanced STB 135, and the HDMI output of the enhanced STB 135 may be connected to a display device 140 (e.g., television). The enhanced STB 135 may control video output to the display device 140 such that when a user selects legacy content for viewing, the enhanced STB 135 passes through the legacy content received from the legacy STB 130 on the HDMI input to the display device 140, and when the user selects enhanced content (e.g., UHDTV content) for viewing, the enhanced STB 135 decodes and outputs the enhanced content to the display device 140.

The enhanced STB 135 may include a user interface component to allow the user to select enhanced content (e.g., UHDTV or 4K), a signaling component between the legacy STB 130 and enhanced STB 135, a switching component that switches output content between multiple content sources, and a remote control component that allows a remote control unit (RCU) 145 to send remote key codes to one of the STBs or to both of the STBs.

In embodiments, a single remote control unit (RCU) 145 may be used to control both the legacy STB 130 and the enhanced STB 135, and from a user perspective, the user can control both or either of the STBs without having to be aware of which STB is being controlled. It will be appreciated by those skilled in the art that various types of control options may be used for controlling the legacy STB 130 and the enhanced STB 135. The legacy STB 130 and the enhanced STB 135 may be controlled by separate RCUs 145. For example, the legacy STB 130 may be controlled by an infrared (IR) RCU 145 and the enhanced STB 135 may be controlled by a Bluetooth RCU 145, and the user can switch between the separate RCUs 145 according to which STB is to be commanded. The legacy STB 130 and the enhanced STB 135 may be controlled by a single, dual-function RCU 145. For example, an IR function can be used on the RCU 145 to control the legacy STB 130 and a Bluetooth function can be used on the RCU 145 to control the enhanced STB 135. The legacy STB 130 and the enhanced STB 135 may be controlled by a single RCU 145. For example, when viewing legacy content, RCU commands can be received by the enhanced STB 135 and relayed to the legacy STB 130 through a signaling interface, and when the user is viewing enhanced content, RCU commands can be received and processed by the enhanced STB 135. It should be understood that the single RCU 145 may be a Bluetooth RCU or an IR RCU.

A remote control component may enable a single RCU 145 to send key codes to a legacy STB 130 and an enhanced STB 135 as appropriate. Fundamentally, key codes can be sent to the legacy STB 130 when legacy content is being displayed and to the enhanced STB 135 when enhanced content is being displayed. For example, when enhanced content is being displayed, key codes received at the legacy STB 130 may be forwarded to the enhanced STB 135. It should be understood that various types of RCUs 145 may be used. The RCU 145 may be a multimode RCU capable of commanding either the legacy STB 130 or the enhanced STB 135 (e.g., buttons on the RCU 145 may be used to set the mode to command the desired STB). In embodiments, all RCU key codes may be sent to the enhanced STB 135, and if the enhanced STB 135 is displaying enhanced content, then the RCU key codes may be processed locally (i.e., at the enhanced STB 135), otherwise, the key codes may be passed to the legacy STB 130 over the signaling interface. In embodiments, all RCU key codes may be sent to the legacy STB 130, and if the enhanced STB 135 is displaying enhanced content, then the legacy STB 130 processes the key codes locally, otherwise, the key codes may be passed to the enhanced STB 135 over the signaling interface.

A signaling protocol may be used between the legacy STB 130 and the enhanced STB 135 to determine from which video source to output content to the display device 140. It will be appreciated that the signaling protocol may include various methods for carrying messages between the legacy STB 130 and the enhanced STB 135 (e.g., Mediaroom Companion application programming interface (API), DataSource methods, HTTP, etc.).

In embodiments, a remote management server 150 may configure an enhanced STB 135 to switch multimedia content sources based on notifications received from a legacy STB 130. The remote management server 150 may establish a communication link with the enhanced STB 135 and may communicate with the enhanced STB 135 to perform various functions including, but not limited to collecting status information from the enhanced STB 135, receiving notification messages from the enhanced STB 135, setting configurations at the enhanced STB 135, downloading new firmware to the enhanced STB 135, and sending commands to the enhanced STB 135. The remote management server 150 may monitor the configuration of the enhanced STB 135 and may remotely change the configuration. For example, the remote management server 150 may change the input (e.g., between legacy services input and enhanced services input) at the enhanced STB 135 that is to be output to a display device 140.

Figure 2:
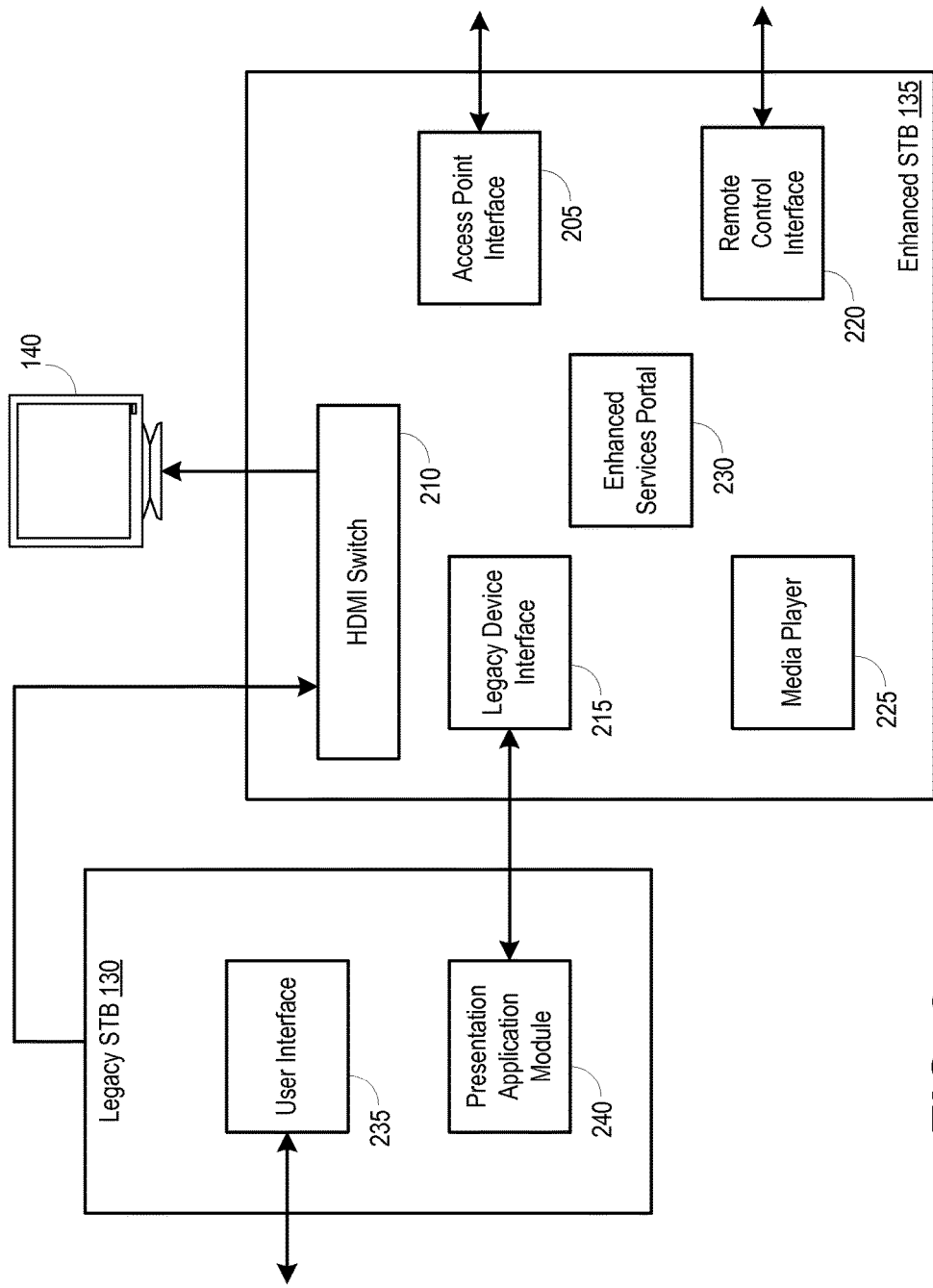
FIG. 2 is a block diagram illustrating an example enhanced STB operable to facilitate coordination with a legacy STB to deliver multiple services to a display device.

FIG. 2 is a block diagram illustrating an example enhanced STB 135 operable to facilitate coordination with a legacy STB 130 to deliver multiple services to a display device 140. The enhanced STB 135 may include an access point interface 205, an HDMI switch 210, a legacy device interface 215, a remote control interface 220, a media player 225, and an enhanced services portal 230.

In embodiments, an enhanced STB 135 may be installed along with a legacy STB 130 within a customer premise, wherein the enhanced STB 135 is configured to provide an enhanced video service (e.g., UHDTV service, 4K video on demand (VoD) service, etc.). In embodiments, an output interface of the legacy STB 130 may be connected to an input interface of the enhanced STB 135, and an output interface of the enhanced STB 135 may be connected to an input interface of a display device (e.g., display device 140). For example, the connection between the legacy STB 130 and the enhanced STB 135 and the connection between the enhanced STB 135 and display device 140 may include HDMI connections.

In embodiments, the enhanced STB 135 and the legacy STB 130 may be configured such that legacy video services and enhanced video services may be output to the display device 140 from the enhanced STB 135.

In embodiments, the legacy STB 130 may include a user interface 235 to allow the user to select enhanced content (e.g., 4K content) to view. The selection may be either a specific asset to view or a launch point to transition to an enhanced services portal. A user guide may be generated and maintained by the legacy STB 130, wherein the guide lists legacy services (e.g., SD and HD programming) offered by the legacy STB 130 as well as an option to view enhanced services (e.g., UHDTV programming) offered by the enhanced STB 135. The guide provided by the legacy STB 130 may include guide items that show a viewer the specific enhanced content that is available to the viewer. The viewer may interact with the guide through the user interface 235 (e.g., using a RCU). Once a selection is made, a signaling component can be invoked to transfer control to the enhanced STB 135. For example, a presentation application module 240 may recognize a selection of enhanced content or services, and may notify the enhanced STB 135 of the content/services selection (e.g., by outputting a notification to the legacy device interface 215 of the enhanced STB 135). In embodiments, the legacy STB 130 may inform the enhanced STB 135 of the content/service selection through an HDMI connection between the STBs (e.g., through the connection via the HDMI switch 210).

In embodiments, the HDMI switch 210 may be configured to switch an input source between the enhanced STB 135 and an output of the legacy STB 130 according to the service that is requested by a user for output to the display device 140. The HDMI switch 210 may control whether legacy content (e.g., non-4K content such as SD or HD) or enhanced content (e.g., 4K content) is output to the display device 140. If legacy content is to be displayed, the HDMI switch 210 input (e.g., the external input that is connected to the legacy STB 130) may be connected to the HDMI switch 210 output (e.g., the external output that is connected to the display device 140). In this configuration, video from the legacy STB 130 is received on the HDMI switch 210 input of the enhanced STB 135 and passed through to the HDMI switch 210 output and on to the display device 140. If enhanced content is to be displayed, a content source internal to the enhanced STB 135 (e.g., the media player 225 and enhanced services portal 230) may be connected to the HDMI switch 210 output. A control interface (e.g., legacy device interface) to the HDMI switch 210 may allow external configuration of the HDMI switch 210. In embodiments, a signaling component (e.g., presentation application module 240, Mediaroom Companion API, DataSource, etc.) may be the primary entity configuring the switching component based on the signaling messages received, however, it should be understood that the switch configuration may be controlled by other entities as well.

In embodiments, a switching control module (e.g., the legacy device interface 215) may include a signaling interface configured to control which output is displayed to the display device 140. It should be understood that various signaling options may be used. For example, an application at the legacy STB 130 (e.g., presentation application module 240) can signal events to the enhanced STB 135 via various methods (e.g., Mediaroom Companion API, DataSource, etc.). Event signals may be passed from the legacy STB 130 to the enhanced STB 135 over a wired or wireless connection. It will be appreciated by those skilled in the relevant art that communications controlling the output of content from the enhanced STB 135 to the display device 140 may be delivered from the legacy STB 130 over any communication protocol that may be used to link the enhanced STB 135 and legacy STB 130.

In embodiments, the signaling interface of the legacy device interface 215 may enable the signaling of communications between the legacy STB 130 and the enhanced STB 135 for the purpose of determining whether to display legacy content (e.g., SD, HD) or enhanced content (e.g., UHDTV or 4K content). For example, the presentation application module 240 may notify the enhanced STB 135 of content or service requests (e.g., enhanced content/service requests) received at the legacy STB 130. It should be understood that different methods may be used to carry the signaling message between the legacy STB 130 and the enhanced STB 135. For example, the signaling may be transmitted using a Mediaroom Companion API. Other methods to carry the signaling message are also possible (e.g., HTTP) depending on the capabilities and constraints of the communicating STBs.

In embodiments, the presentation application module 240 may be configured to send an event notification to signal the enhanced STB 135 to return control to the legacy STB 130 (e.g., when an emergency alert system (EAS) message is received by the legacy STB 130). The enhanced STB 135 may use, for example, Companion APIs (e.g., at the legacy device interface 215) to send remote control key codes to the legacy STB 130, thereby allowing a single RCU (e.g., Bluetooth remote) to be used to control both the enhanced STB 135 and the legacy STB 130. The legacy STB 130 may use, for example, a DataSource method to send remote control key codes to the enhanced STB 135.

The presentation application module 240 may control the operation of the HDMI switch 210 at the enhanced STB 135. For example, the presentation application module 240 may recognize whether content requested for output to the display device 140 may be provided by the legacy STB 130 or the enhanced STB 135. If the requested content may be provided by the legacy STB 130, then the presentation application module 240 may instruct the HDMI switch 210 to output content received at an input of the HDMI switch 210 from the legacy STB 130. If the requested content may be provided by the enhanced STB 135, then the presentation application module 240 may instruct the HDMI switch 210 to output content received at an input of the HDMI switch 210 from an internal module of the enhanced STB 135.

The presentation application module 240 may be configured to determine which STB is capable of providing a requested service based on various factors including, but not limited to the source of the content (e.g., enhanced services network 125 of FIG. 1 or legacy services network 120 of FIG. 1), the type of content requested (e.g., SD, HD, UHDTV, etc.), and others. For example, content having a source within the enhanced services network 125 and content identified as UHDTV content may be fed through the HDMI switch 210 to the display device 140 from one or more internal modules at the enhanced STB 135. As another example, content having a source within the legacy services network 120 of FIG. 1 and content identified as SD or HD content may be fed through the HDMI switch 210 to the display device 140 from the legacy STB 130. A table identifying which STB is responsible for providing which content presented to a viewer within a guide may be used by the presentation application module 240 to determine which HDMI switch 210 input should be used to feed the output to the display device 140.

In embodiments, the presentation application module 240 may forward key codes received from an RCU to the enhanced STB 135 (e.g., the legacy device interface 215). For example, when enhanced services are being output by the enhanced STB 135 to the display device 140, key codes received at the legacy STB 130 may be forwarded through the presentation application module 240 to the legacy device interface 215.

It will be appreciated that various messaging protocols may be used to pass communications between the legacy STB 130 and the enhanced STB 135. As an example, the following event messages may be passed between the legacy STB 130 and the enhanced STB 135: message verifying communication link between the legacy STB 130 and enhanced STB 135; status report on the current video source being displayed; message setting video source as an HDMI input at the enhanced STB 135 (e.g., legacy content); message setting video source to be the enhanced STB 135 (e.g., enhanced content).

Figure 3:
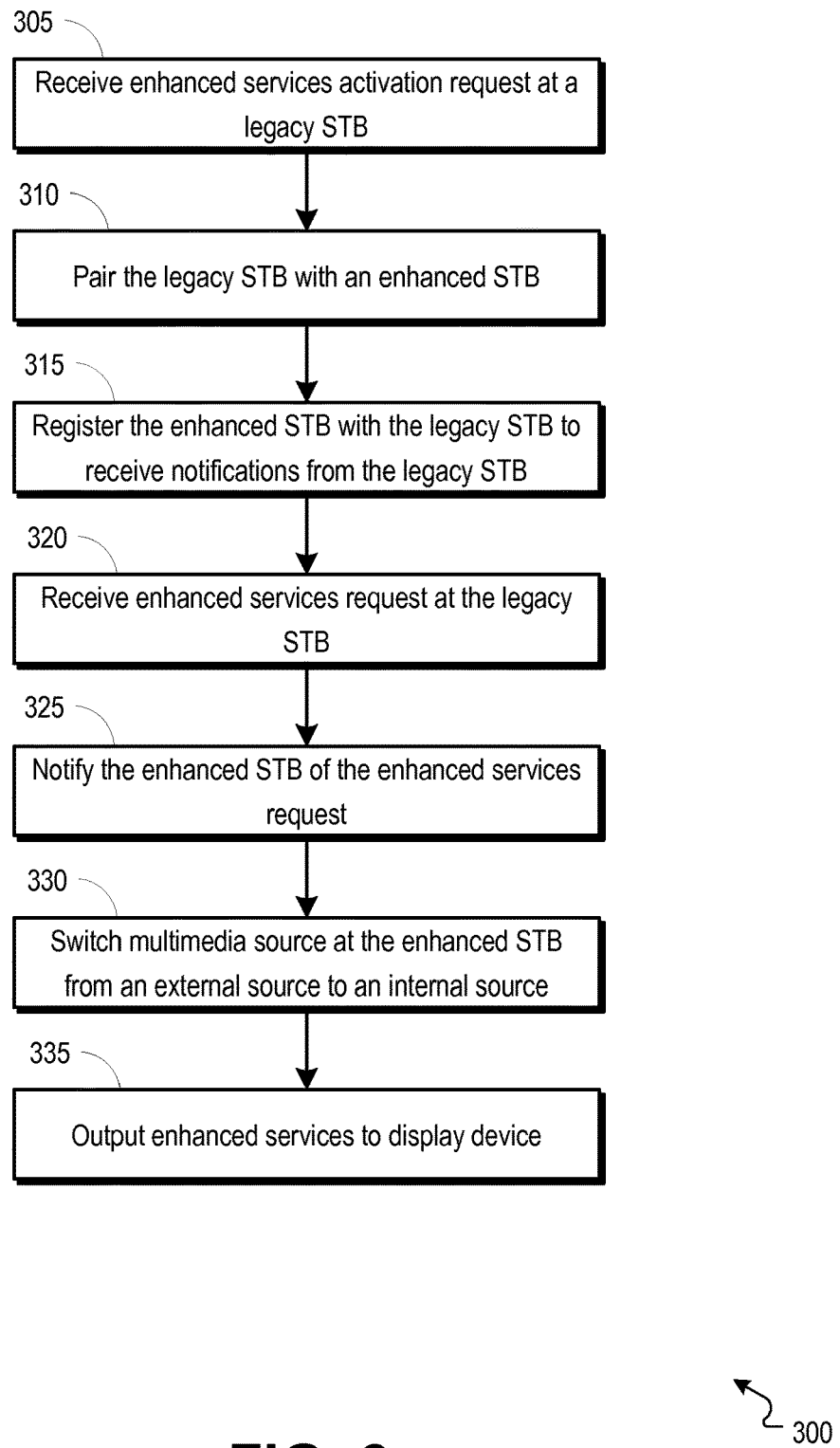
FIG. 3 is a flowchart illustrating an example process operable to facilitate a content source switch at an enhanced STB.

FIG. 3 is a flowchart illustrating an example process 300 operable to facilitate a content source switch at an enhanced STB. The process 300 may begin at 305 when an enhanced services activation request is received at a legacy STB (e.g., legacy STB 130 of FIG. 1). In embodiments, an enhanced services activation menu item may be added to a menu that is output from the legacy STB. The enhanced services activation menu item may be presented to a user at a display device (e.g., display device 140 of FIG. 1), and the enhanced services activation menu item may be selected by the user via a RCU (e.g., RCU 145 of FIG. 1).

At 310, the legacy STB may be paired with an enhanced STB (e.g., enhanced STB 135 of FIG. 1). During the pairing process, the legacy STB 130 and enhanced STB 135 may discover each other and may establish a channel of communication. The legacy STB and the enhanced STB may exchange communications to establish a channel of communication between each other. For example, a presentation application (e.g., presentation application module 240 of FIG. 2) of the legacy STB may be paired with an interface (e.g., legacy device interface 215 of FIG. 2, companion API, etc.) of the enhanced STB.

At 315, the enhanced STB may register with the legacy STB to receive notifications from the legacy STB. The legacy STB may offer various services for the benefit of other devices (e.g., receiving certain notifications), and the enhanced STB may register or subscribe to one or more of the services offered by the legacy STB. In embodiments, the enhanced STB may register with a presentation application (e.g., presentation application module 240 of FIG. 2) of the legacy STB, wherein the presentation application is configured to output a notification to the enhanced STB when a request for enhanced services is received at the legacy STB.

At 320, an enhanced services request may be received at the legacy STB. In embodiments, an enhanced services portal menu item may be output to a display (e.g., display device 140 of FIG. 1) by the legacy STB, and the user may select the enhanced services portal menu item via a RCU (e.g., RCU 145 of FIG. 1). The selection of the enhanced services portal menu item may constitute a request for enhanced services (e.g., 4K or UHDTV).

At 325, the enhanced STB may be notified of the enhanced services request. In embodiments, a message may be output from the legacy STB (e.g., from the presentation application module 240) to the enhanced STB (e.g., to the legacy device interface 215, companion API, etc.). The message may include a notification of the request made by the user for the delivery of enhanced services.

At 330, the enhanced STB may switch the multimedia source being used to provide content to a display device (e.g., display device 140) from an external source to an internal source. In embodiments, the enhanced STB may include an HDMI switch (e.g., HDMI switch 210 of FIG. 2) that includes two input interfaces and a single output interface. One of the input interfaces may be an external HDMI input interface that is connected to an output of the legacy STB, and the other input interface may be an internal HDMI input interface that is connected to one or more internal components of the enhanced STB (e.g., media player 225 of FIG. 2, enhanced services portal 230 of FIG. 2, etc.). The output interface may be an external HDMI output interface and may be connected to an input interface at a display device (e.g., display device 140).

When delivering legacy services, the output interface of the HDMI switch may be connected to the external HDMI input interface (e.g., the HDMI input interface connected to the legacy STB), and legacy services received from the legacy STB may be passed through the HDMI switch to the display device. When a request for enhanced services is received, the position of the HDMI switch may be changed so that the output interface of the HDMI switch is connected to the internal HDMI input interface, and enhanced services may be received from a media player or enhanced services portal of the enhanced STB and output through the HDMI switch to the display device at 335.

Figure 4:
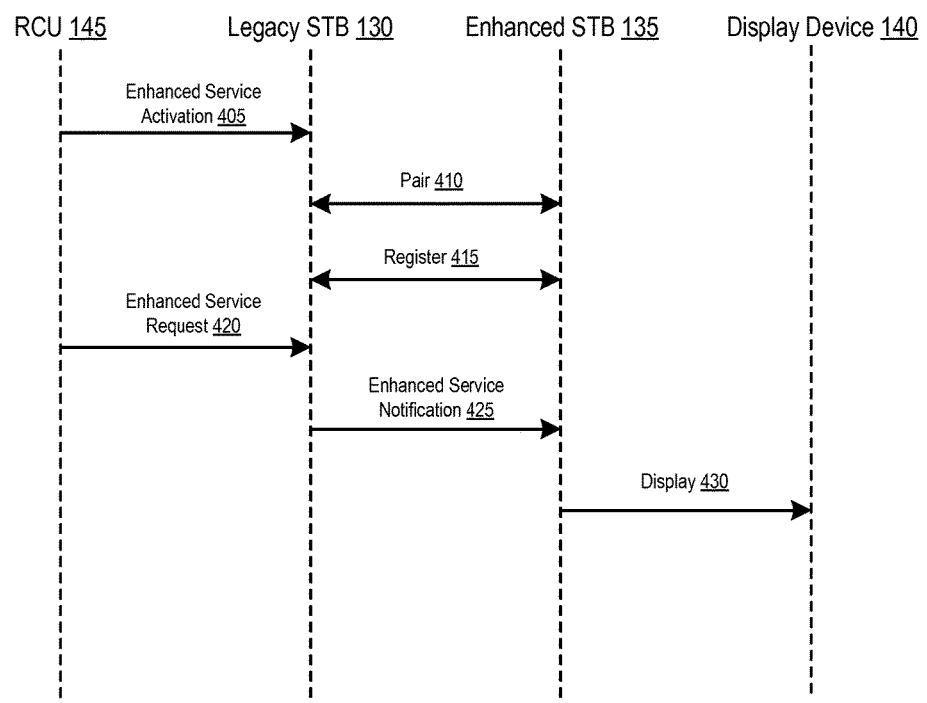
FIG. 4 is a communication flow diagram showing communications that may facilitate a content source switch at an enhanced STB.

FIG. 4 is a communication flow diagram 400 showing communications that may facilitate a content source switch at an enhanced STB. In embodiments, a legacy STB 130 may be connected to an enhanced STB 135 through a HDMI connection. A user may request activation of an enhanced service (e.g., 4K or UHDTV content) through an interface displayed at a display device (e.g., display device 140). The request for the activation of the enhanced service (e.g., enhanced service activation 405) may be received at a receiver of the legacy STB 130 from an RCU 145.

After receiving the enhanced service activation 405, the legacy STB 130 may initiate a pairing (e.g., pair 410) and registering (e.g., register 415) between the legacy STB 130 and the enhanced STB 135. When a user selects an enhanced service portal (e.g., 4K or UHDTV portal) via the display device (e.g., display device 140) and RCU 145, the legacy STB 130 may receive an enhanced service request 420 from the RCU 145. The legacy STB 130 may generate and output an enhanced service notification 425 (e.g., through the presentation application module 240 of FIG. 2) to the enhanced STB 135, wherein the enhanced service notification 425 instructs the enhanced STB 135 to switch the HDMI output to output an enhanced service (e.g., the requested enhanced services portal).

In embodiments, the presentation application module 240 of the legacy STB 130 and an interface of the enhanced STB 135 (e.g., a companion API included within the legacy device interface 215 of FIG. 2) may be used to transfer control from the legacy STB 130 to the enhanced STB 135 when the enhanced service is requested. For example, the presentation application module 240 may be operable to activate a new service menu item at the legacy STB 130, initiate pairing and registration with the enhanced STB 135, add an enhanced service portal menu to the legacy STB 135 menu, and send an event message (e.g., enhanced service notification 425) to the enhanced STB 135. The enhanced service notification 425 may trigger the output of the requested enhanced service from the enhanced STB 135 to the display device 140 (e.g., display 430).

Figure 5:
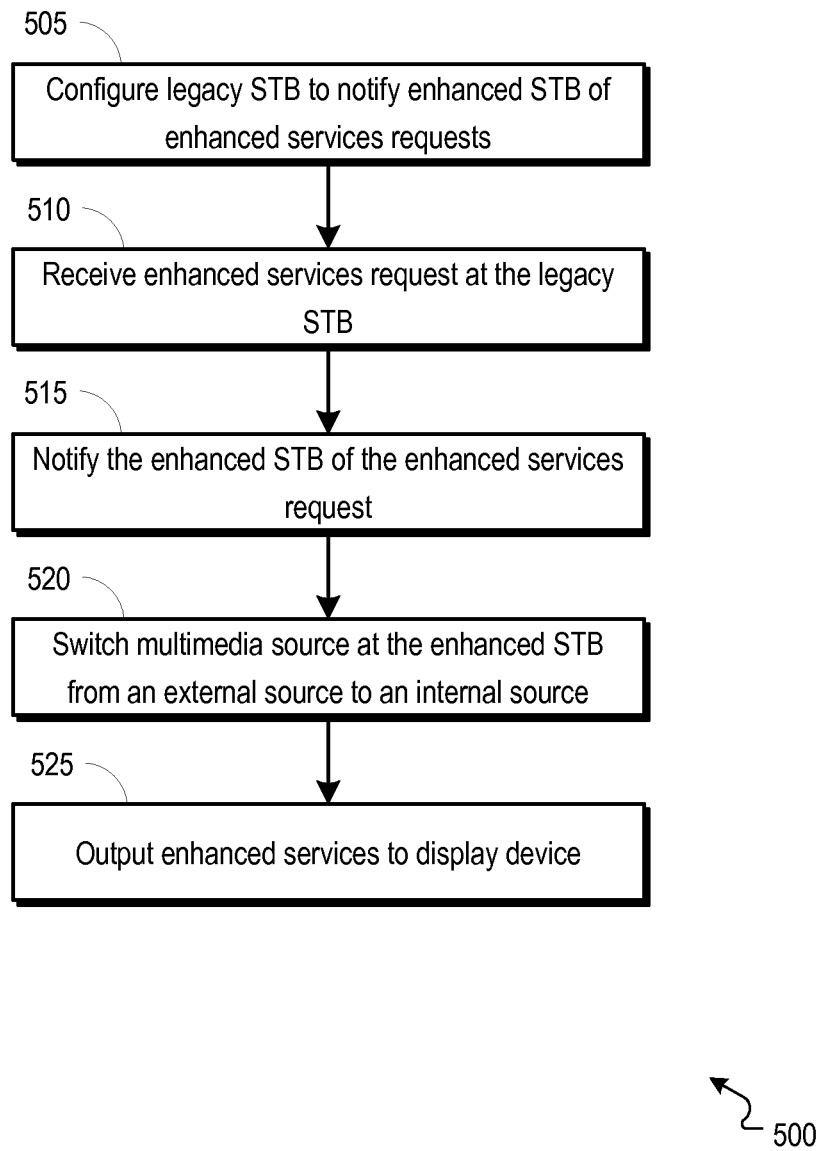
FIG. 5 is a flowchart illustrating an example process operable to facilitate a content source switch at an enhanced STB based on a notification received at a server associated with the enhanced STB.

FIG. 5 is a flowchart illustrating an example process 500 operable to facilitate a content source switch at an enhanced STB based on a notification received at a server associated with the enhanced STB. The process 500 may begin at 505 when a legacy STB (e.g., legacy STB 130 of FIG. 1) is configured to notify an enhanced STB (e.g., enhanced STB 135 of FIG. 1) of enhanced services requests that are received by the legacy STB. In embodiments, the legacy STB may be provided with a location (e.g., uniform resource locator (URL)) associated with a server at the enhanced STB (e.g., HTTP server), and the server may be configured to receive notifications from the legacy STB. For example, a presentation application of the legacy STB (e.g., the presentation application module 240 of FIG. 2) may be configured to output a notification to the enhanced STB (e.g., HTTP server) when a request for enhanced services is received at the legacy STB.

At 510, an enhanced services request may be received at the legacy STB. In embodiments, an enhanced services portal menu item may be output to a display (e.g., display device 140 of FIG. 1) by the legacy STB, and the user may select the enhanced services portal menu item via a RCU (e.g., RCU 145 of FIG. 1). The selection of the enhanced services portal menu item may constitute a request for enhanced services (e.g., 4K or UHDTV).

At 515, the enhanced STB may be notified of the enhanced services request. In embodiments, a message may be output from the legacy STB (e.g., from the presentation application module 240) to the enhanced STB (e.g., to the legacy device interface 215, HTTP server at the enhanced STB, etc.). The message may include a notification of the request made by the user for the delivery of enhanced services. The message may be formatted as an XML message (e.g., DataSource XML message) or any other communication protocol that may pass information to an HTTP server.

At 520, the enhanced STB may switch the multimedia source being used to provide content to a display device (e.g., display device 140) from an external source to an internal source. In embodiments, the enhanced STB may include an HDMI switch (e.g., HDMI switch 210 of FIG. 2) that includes two input interfaces and a single output interface. One of the input interfaces may be an external HDMI input interface that is connected to an output of the legacy STB, and the other input interface may be an internal HDMI input interface that is connected to one or more internal components of the enhanced STB (e.g., media player 225 of FIG. 2, enhanced services portal 230 of FIG. 2, etc.). The output interface may be an external HDMI output interface and may be connected to an input interface at a display device (e.g., display device 140).

When delivering legacy services, the output interface of the HDMI switch may be connected to the external HDMI input interface (e.g., the HDMI input interface connected to the legacy STB), and legacy services received from the legacy STB may be passed through the HDMI switch to the display device. When a request for enhanced services is received, the position of the HDMI switch may be changed so that the output interface of the HDMI switch is connected to the internal HDMI input interface, and enhanced services may be received from a media player or enhanced services portal of the enhanced STB and output through the HDMI switch to the display device at 525.

Figure 6:
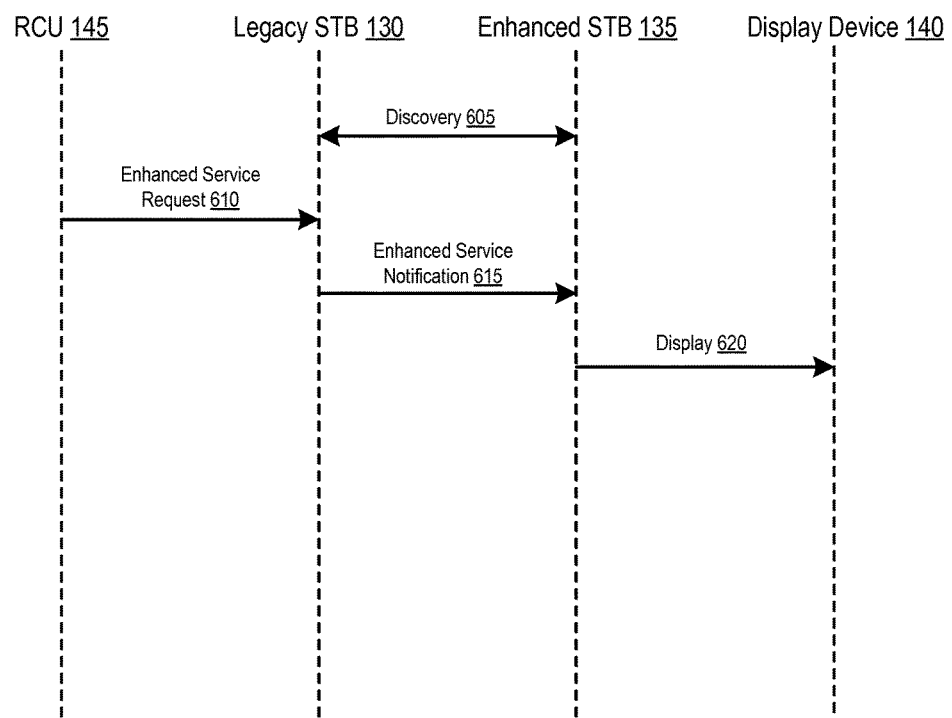
FIG. 6 is a communication flow diagram showing communications that may facilitate a content source switch at an enhanced STB based on a notification received at a server associated with the enhanced STB.

FIG. 6 is a communication flow diagram 600 showing communications that may facilitate a content source switch at an enhanced STB based on a notification received at a server associated with the enhanced STB. In embodiments, a legacy STB 130 and an enhanced STB 135 may be connected by an HDMI connection and may coordinate with each other through a discovery process (e.g., discovery 605). During the discovery process, the legacy STB 130 and enhanced STB 135 may make their presence known to each other. For example, the legacy STB 130 may broadcast, multicast, or unicast information about the services provided by the legacy STB 130. The enhanced STB 135 may receive the information transmitted from the legacy STB 130 and may identify one or more services that it is interested in receiving from the legacy STB 130.

When an enhanced service is requested (e.g., enhanced service portal is selected), and an enhanced service request 610 is received by the legacy STB 130, the legacy STB 130 can generate and output a notification message (e.g., enhanced service notification 615) to the enhanced STB 135. The enhanced service notification 615 may instruct the enhanced STB 135 to switch an HDMI output to output the requested enhanced service (e.g., the enhanced service portal) to the display device 140 (e.g., display 620).

In embodiments, a presentation application module of the legacy STB 130 (e.g., presentation application module 240 of FIG. 2) may use, for example, a DataSource method to transfer control from the legacy STB 130 to the enhanced STB 135. The presentation application module may be configured to add an enhanced service portal menu item to the legacy STB 130 menu and to output a notification message to the enhanced STB 135 to trigger the delivery of the enhanced service. The notification message (e.g., enhanced service notification 615) may be formatted as a DataSource XML message. An HTTP server at the enhanced STB 135 may identify the event contained in the enhanced service notification 615.

Figure 7:
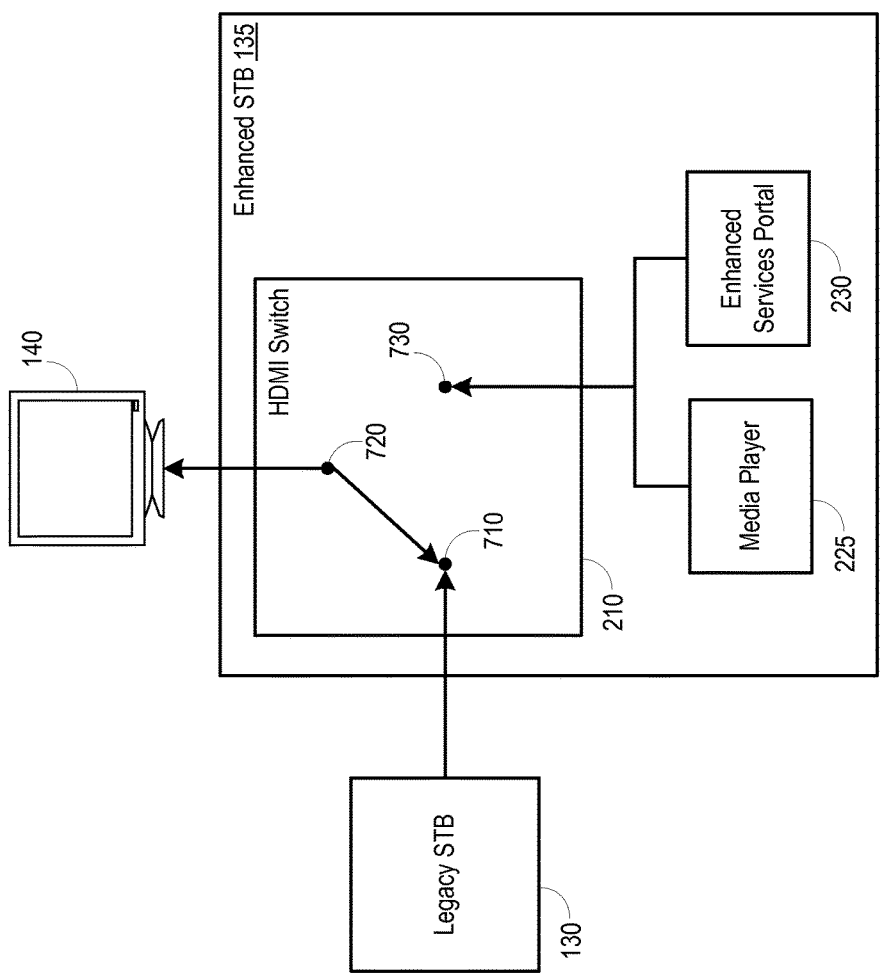
FIG. 7 is a block diagram illustrating an example enhanced STB comprising an HDMI switch operable to facilitate a content source switch based on a notification received from a legacy STB.

FIG. 7 is a block diagram illustrating an example enhanced STB 135 comprising an HDMI switch 210 operable to facilitate a content source switch based on a notification received from a legacy STB 130. In embodiments, the HDMI switch 210 may be used to switch a video source between legacy content and enhanced content. For example, when legacy content (e.g., SD, HD, etc.) is requested by a user, the HDMI switch 210 can be positioned such that legacy content received at a legacy STB input 710 from a legacy STB 130 is output through a display device output 720 to a display device 140. When enhanced content is requested by a user, the HDMI switch 210 may be positioned such that enhanced content received internally (e.g., from the media player 225 and/or enhanced services portal 230) at an enhanced STB input 730 is output through the display device output 720 to the display device 140.

In embodiments, legacy content may be distinguished from enhanced content by a module at the legacy STB 130 (e.g., presentation application module 240 of FIG. 2). The determination as to whether the HDMI switch 210 is to be positioned at the legacy STB input 710 or the enhanced STB input 730 may be based on the source of the requested content or the type of requested content. For example, if the requested content has a source associated with an enhanced service (e.g., enhanced services network 125 of FIG. 1) or the requested content is enhanced content (e.g., UHDTV), then the legacy STB 130 may instruct the HDMI switch 210 to position itself at the enhanced STB input 730. As another example, if the requested content has a source associated with a legacy service (e.g., legacy services network 120 of FIG. 1) or the requested content is legacy content (e.g., SD or HD content), then the legacy STB 130 may instruct the HDMI switch 210 to position itself at the legacy STB input 710.

Figure 8:
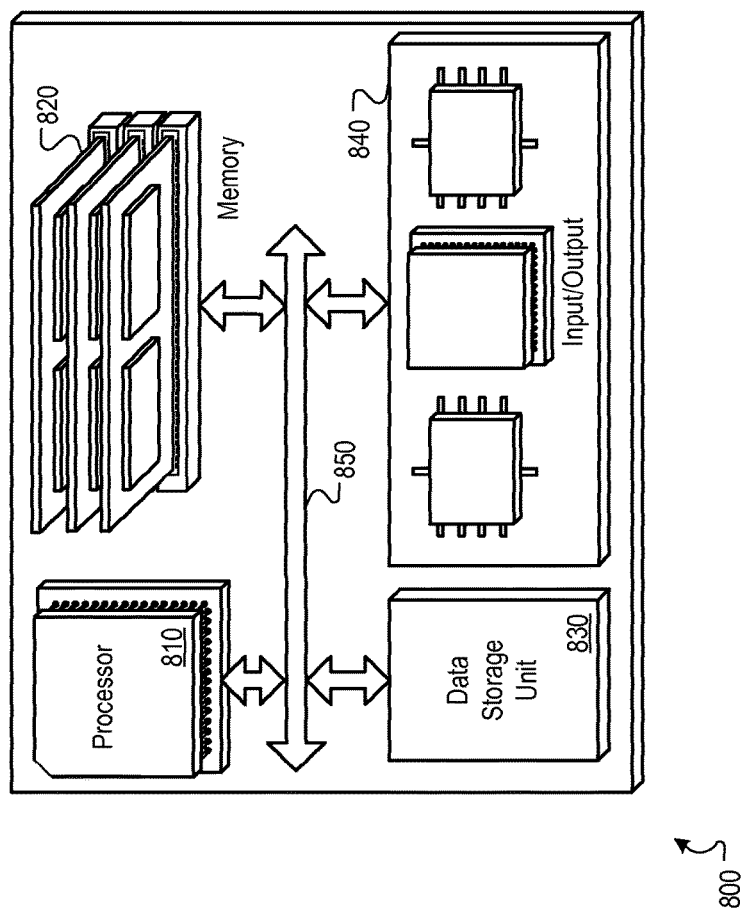
FIG. 8 is a block diagram of a hardware configuration operable to facilitate the coordination of multiple devices to provide multiple services.

FIG. 8 is a block diagram of a hardware configuration 800 operable to facilitate the coordination of multiple devices to provide multiple services. It should be understood that the hardware configuration 800 can exist in various types of devices. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more devices within a subscriber premise (e.g., access point 105 of FIG. 1, legacy STB 130 of FIG. 1, enhanced STB 135 of FIG. 1, display device 140 of FIG. 1, etc.) and/or one or more networks (e.g., subscriber network 115 of FIG. 1, WAN 110 of FIG. 1, local network, etc.). The input/output device may include driver devices and/or receivers to receive communications from an RCU 145 of FIG. 1 (e.g., RF RCU, IR RCU, Bluetooth RCU, dual-mode RCU, etc.).

Those skilled in the art will appreciate that the invention improves upon methods and apparatuses for coordinating service offerings between multiple devices. Methods, systems, and computer readable media may be operable to facilitate the coordination of multiple devices to provide multiple services. A legacy set-top box (STB) configured to provide legacy services may be connected to an enhanced STB that is configured to provide enhanced services. The enhanced STB may include a switch that is configured to switch a content input source between the legacy STB and the enhanced STB. The legacy STB may receive user requests for content, and based on the type of content requested, the legacy STB may output a signal to the enhanced STB directing that the input source be switched according to the type of content requested. A user interface output from the legacy STB may provide a user with one or more menu items for requesting a legacy service or enhanced service.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a request for content at a first device, wherein the first device is configured to provide a first service;
   outputting a notification of the request for content to a second device, wherein the notification comprises an identification of a service type associated with the requested content, and wherein the second device comprises a switching element comprising:
      an external input connected to an output of the first device;
      an internal input connected to a module within the second device that is configured to provide a second service; and
      an output connected to a display device;
   determining whether the service type associated with the requested content is associated with the first device or the second device;
   automatically switching between the external input and the internal input based upon the service type associated with the requested content, wherein the external input is selected when the determination is made that the service type associated with the requested content is associated with the first device, and the internal input is selected when the determination is made that the service type associated with the requested content is associated with the second device;
   outputting the requested content to the display device; and
   while the internal input is selected, forwarding one or more key codes that are received at the first device to the second device.

2. The method of claim 1, wherein the switching element is switched from the external input to the internal input when the service type associated with the requested content comprises a service type associated with the second service.

3. The method of claim 1, wherein the switching element is switched from the internal input to the external input when the service type associated with the requested content comprises a service type associated with the first service.

4. The method of claim 1, wherein the first device comprises a set-top box configured to provide standard definition and high definition content.

5. The method of claim 1, wherein the second device comprises a set-top box configured to provide ultra high definition television content.

6. The method of claim 1, wherein the switching element comprises a high definition multimedia interface.

7. The method of claim 1, wherein the notification comprises an extensible markup language message that is output to an HTTP server associated with the second device.

8. The method of claim 1, further comprising:
receiving one or more key codes at a receiver associated with the first device, wherein the one or more key codes are received from a remote control unit; and
forwarding the one or more key codes to the second device.

9. An apparatus comprising:
an interface configured to be used to receive a notification of a request for content that is received at a first device, wherein the notification comprises an identification of a service type associated with the requested content, and wherein the first device is configured to provide a first service;
one or more service modules configured to provide a second service;
a switching module comprising:
an external input interface connected to an output of the first device, wherein the external input interface is configured to be used to receive the first service from the first device;
an internal input interface connected to the one or more service modules, wherein the internal input interface is configured to be used to receive the second service from the one or more service modules; and
an output interface connected to a display device, wherein the output interface is configured to be used to output content to the display device;
a switching control module configured to:
determine whether the service type associated with the requested content is associated with the first service or the second service;
trigger a switch between the external input interface and the internal input interface based upon the service type associated with the requested content, wherein the external input is selected when the determination is made that the service type associated with the requested content is associated with the first service, and the internal input is selected when the determination is made that the service type associated with the requested content is associated with the second service; and
while the internal input is selected, forwarding one or more key codes that are received at the first device to the second device.

10. The apparatus of claim 9, wherein the switching control module is configured to trigger a switch from the external input interface to the internal input interface when the service type associated with the requested content comprises a service type associated with the second service.

11. The apparatus of claim 9, wherein the switching control module is configured to trigger a switch from the internal input interface to the external input interface when the service type associated with the requested content comprises a service type associated with the first service.

12. The apparatus of claim 9, wherein the first device comprises a set-top box configured to provide standard definition and high definition content.

13. The apparatus of claim 9, wherein the one or more service modules are configured to provide ultra high definition television content.

14. One or more non-transitory computer readable media having instructions operable to cause one or more processors to perform the operations comprising:
receiving a request for content at a first device, wherein the first device is configured to provide a first service;
outputting a notification of the request for content to a second device, wherein the notification comprises an identification of a service type associated with the requested content, and wherein the second device comprises a switching element comprising:
an external input connected to an output of the first device;
an internal input connected to a module within the second device that is configured to provide a second service; and
an output connected to a display device;
determining whether the service type associated with the requested content is associated with the first device or the second device;
switching between the external input and the internal input based upon the service type associated with the requested content, wherein the external input is selected when the determination is made that the service type associated with the requested content is associated with the first device, and the internal input is selected when the determination is made that the service type associated with the requested content is associated with the second device;
outputting the requested content to the display device; and
while the internal input is selected, forwarding one or more key codes that are received at the first device to the second device.

15. The one or more non-transitory computer-readable media of claim 14, wherein the switching element is switched from the external input to the internal input when the service type associated with the requested content comprises a service type associated with the second service.

16. The one or more non-transitory computer-readable media of claim 14, wherein the switching element is switched from the internal input to the external input when the service type associated with the requested content comprises a service type associated with the first service.

17. The one or more non-transitory computer-readable media of claim 14, wherein the first device comprises a set-top box configured to provide standard definition and high definition content.

18. The one or more non-transitory computer-readable media of claim 14, wherein the second device comprises a set-top box configured to provide ultra high definition television content.

19. The one or more non-transitory computer-readable media of claim 14, wherein the switching element comprises a high definition multimedia interface.

20. The one or more non-transitory computer-readable media of claim 14, wherein the instructions are further operable to cause one or more processors to perform the operations comprising:
    receiving one or more key codes at a receiver associated with the first device, wherein the one or more key codes are received from a remote control unit; and
    forwarding the one or more key codes to the second device.

* * * * *